June 18, 1957 L. R. JACOBSEN 2,796,471

CARRIER FREQUENCY REJECTION AMPLIFIERS OR THE LIKE

Filed Sept. 23, 1954 4 Sheets-Sheet 1

LANCE R. JACOBSEN

INVENTOR.

BY [signature]

HIS ATTORNEY

June 18, 1957 L. R. JACOBSEN 2,796,471

CARRIER FREQUENCY REJECTION AMPLIFIERS OR THE LIKE

Filed Sept. 23, 1954 4 Sheets-Sheet 2

LANCE R. JACOBSEN
*INVENTOR.*

BY [signature]

HIS ATTORNEY

LANCE R. JACOBSEN
*INVENTOR.*
BY
HIS ATTORNEY

June 18, 1957 L. R. JACOBSEN 2,796,471

CARRIER FREQUENCY REJECTION AMPLIFIERS OR THE LIKE

Filed Sept. 23, 1954 4 Sheets-Sheet 4

LANCE R. JACOBSEN
*INVENTOR.*

BY [signature]

HIS ATTORNEY

United States Patent Office 2,796,471

Patented June 18, 1957

2,796,471

CARRIER FREQUENCY REJECTION AMPLIFIERS OR THE LIKE

Lance R. Jacobsen, Lynwood, Calif., assignor to Hoffman Electronics Corporation, a corporation of California Application September 23, 1954, Serial No. 457,867

5 Claims. (Cl. 179—171)

This invention is related to signal rejection circuits, and more particularly to an improved rejection circuit suited to reject unwanted carrier frequencies while amplifying the modulation components thereof.

In the past, the need has arisen for a carrier rejection circuit which renders the carrier side bands unaffected by such carrier rejection. This has been particularly true in the telephone communications art. Telephone transmitting systems transmit the side band channels together with a carrier of reduced amplitude. The sole purpose of the carrier transmission is to supply sufficient carrier signal to actuate the AFC system of the receiver. However, neglecting the AFC function served by the reduced carrier, its presence in that portion of the receiver following the I. F. strip contributes to extremely objectionable receiver response which, in the absence of costly filter networks, produces highly unsatisfactory performance. It therefore becomes desirable to design a suitable carrier rejection circuit for insertion in the portion of a telephone receiver following the I. F. strip. Suitability of such a rejection circuit would lie in the circuit's ability to render carrier modulation components undisturbed, despite carrier rejection.

Therefore, it is an object of this invention to provide an improved carrier frequency rejection amplifier.

It is a further object of this invention to provide an improved carrier frequency rejection amplifier which will reject the unwanted carrier without affecting the modulation components thereof.

According to the present invention, two vacuum tubes having a common cathode load resistor have their control electrodes coupled together through a crystal which is series-resonant at the carrier frequency. The carrier and modulation components appear as signal voltages across the common cathode load resistor. The carrier frequency is passed through the crystal to the control electrode of the second vacuum tube. Being 180° out of phase, the carrier frequencies applied to the cathode and to the control electrode, respectively, of the second vacuum tube will cancel, and the only frequencies which will pass through the second vacuum tube and appear in the tuned output circuit thereof will be the carrier modulation components.

Figure 1:
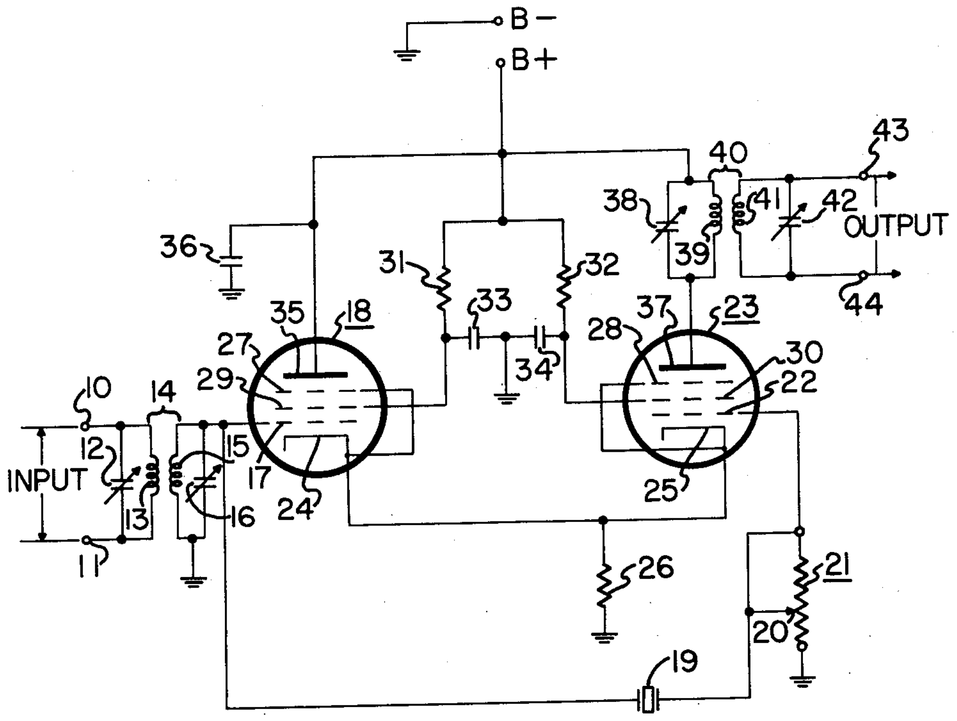

The features of the present invention which are believed to be novel are set forth with particularity in the appended claims. The present invention, both as to its organization and manner of operation, together with further objects and advantages thereof may best be understood by reference to the following description taken in connection with the accompanying drawing, in which:

Figure 1 is a schematic diagram of a carrier frequency rejection amplifier according to the present invention.

Figure 2:
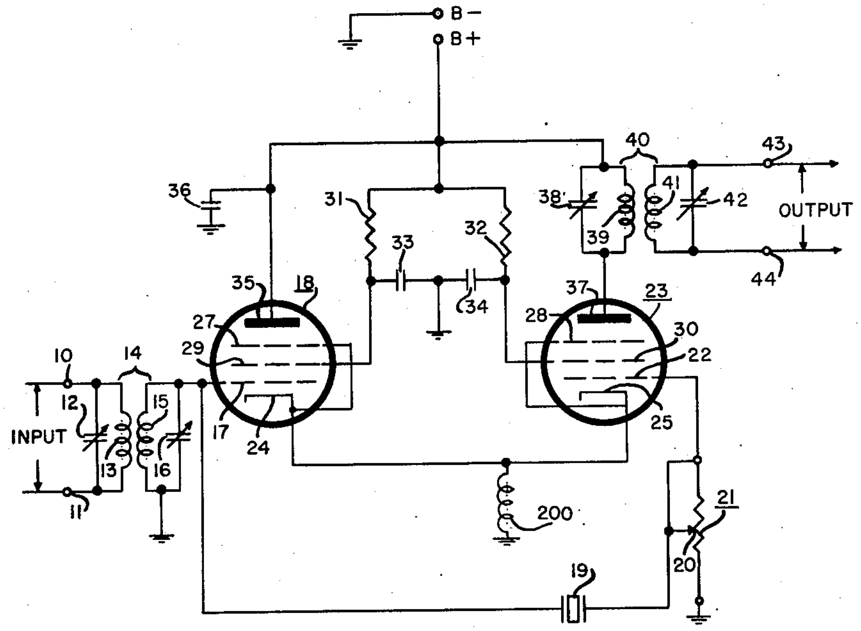
Figure 3:
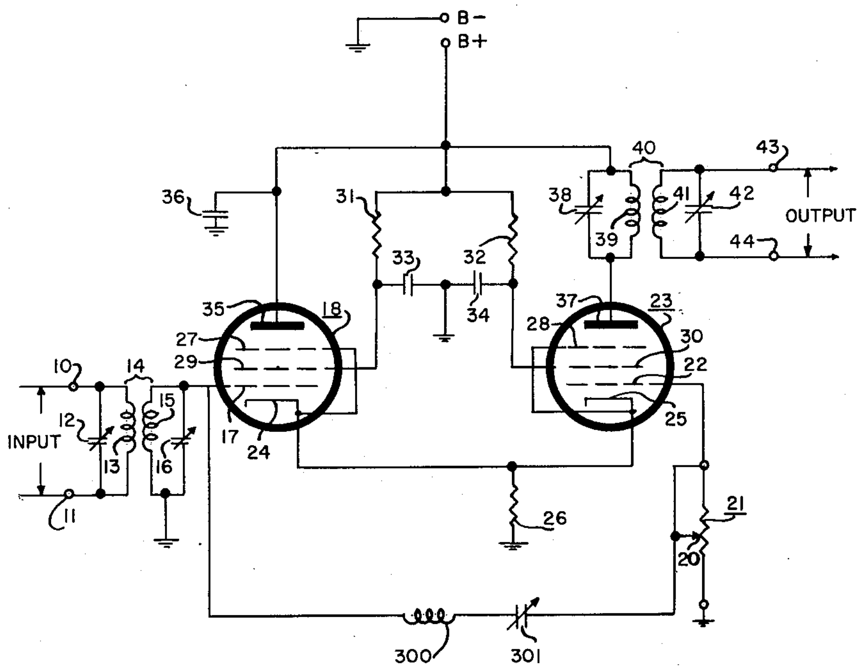
Figure 4:
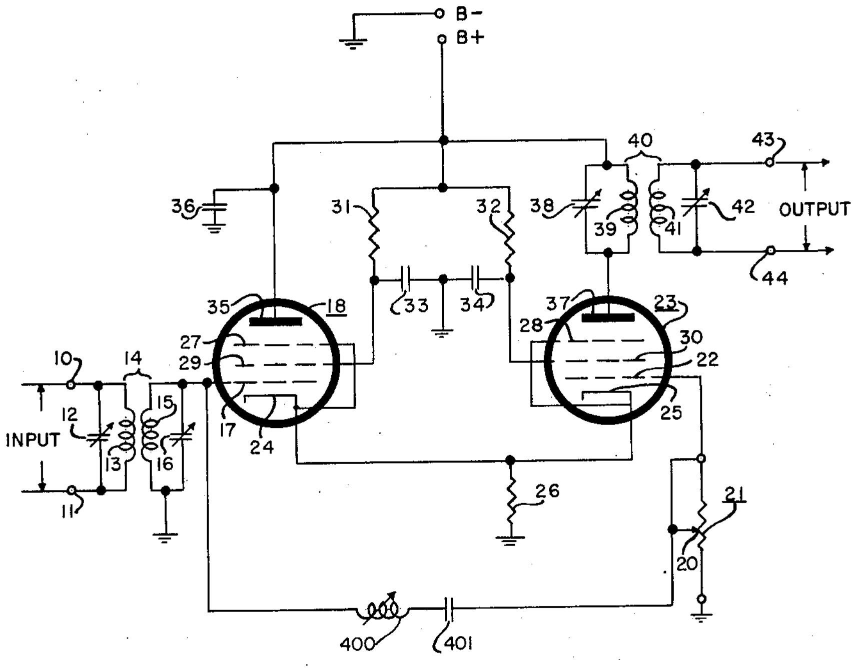

Figures 2, 3, and 4 illustrate circuits similar to that shown in Figure 1, but including slight modifications.

In Figure 1, input terminals 10 and 11 are coupled across a parallel resonant circuit consisting of variable capacitor 12 and primary winding 13 of transformer 14. All parallel resonant circuits shown in Figure 1 are tuned to the carrier frequency and have a band-pass sufficiently wide to pass the carrier and the modulation components thereof. Secondary winding 15 of transformer 14 and variable capacitor 16 form a parallel resonant circuit which is coupled between ground and control electrode 17 of vacuum tube 18. Control electrode 17 is also coupled through crystal 19 to tap 20 of variable resistor 21, and to control electrode 22 of vacuum tube 23. Cathodes 24 and 25 of vacuum tubes 18 and 23, respectively, are jointly coupled through common cathode load resistor 26 to ground. An inductor (such as inductor 200 in Figure 2) may be used as a common cathode load impedance in lieu of resistor 26 to increase gain, if desired. Suppressor grid 27 is connected to cathode 24, and suppressor grid 28 is connected to cathode 25, in conventional manner. Screen grids 29 and 30 are connected through screen dropping resistors 31 and 32, respectively, to a source of positive voltage (B+). Screen grids 29 and 30 are also by-passed to ground through capacitors 33 and 34, respectively. Anode 35 of vacuum tube 18 is connected to a source of positive voltage (B+), and also to ground through R. F. by-pass capacitor 36. Anode 37 of vacuum tube 23 is coupled to a source of positive voltage (B+) through a parallel resonant circuit consisting of variable capacitor 38 and primary winding 39 of transformer 40. Secondary winding 41 of transformer 40 and variable capacitor 42 form an output parallel resonant circuit which is coupled between output terminals 43 and 44. The end terminals of variable resistor 21 are alternatively connected to control electrode 22 of vacuum tube 23 and to ground.

The circuit shown in Figure 1 operates as follows. An input signal consisting of carrier and modulation components is coupled through transformer 14, and the parallel resonant circuits associated therewith, to control electrode 17 of vacuum tube 18. Anode 35 of vacuum tube 18 is placed at R. F. ground potential, by virtue of by-pass capacitor 36, so that the entire carrier and side bands appear across common cathode load resistor 26. Accordingly, the voltages appearing at control electrode 17 and cathode 24 will be in phase. Crystal 19 has a series-resonant frequency equal to the carrier frequency and a relatively narrow pass band, and being thus chosen, passes only the carrier to the input circuit of vacuum tube 23. Accordingly, the carrier signal appearing at control electrode 22 of vacuum tube 23 will be 180° out of phase with the carrier signal appearing at control electrode 17 of vacuum tube 18 and 180° out of phase with the carrier signal at cathode 25. Tap 20 of variable resistor 21 is adjusted so that the carrier signal appearing at control electrode 22 of vacuum tube 23 will just balance out the carrier signal appearing at cathode 25. As a consequence, only the side band frequencies appearing across cathode load resistor 26 will be transferred to the anode circuit of vacuum tube 23. Therefore, only the modulation components of the total signal will appear in the anode parallel-resonant circuit of vacuum tube 23, and hence, in the output of the rejection amplifier. Crystals presently in use have a series-resonant response which is extremely narrow, perhaps only a few cycles. The crystal in the present invention may be replaced by an inductive-capacitive tunable series-resonant circuit to achieve any desired modification of the input pass-band. This is illustrated in Figures 3 and 4 by the employment therein of inductor 300 and capacitor 301, and of inductor 400 and capacitor 401, respectively. Therefore, by the subject rejection amplifier circuit, carrier rejection is effected while at the same time reserving the entire side-band channels, up to within 5 or 6 cycles of the carrier frequency. Tests performed in conjunction with the subject carrier rejection circuit have shown remarkable results, results which obviously are highly desirable in all carrier rejection circuit systems.

Circuits similar to the one shown and described may be cascaded to attain higher degrees of carrier suppression, as desired.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. A carrier frequency rejection amplifier including, in combination, first and second vacuum tubes each having anode, cathode, and control electrodes, an input circuit coupled between said cathode and control electrodes of said first vacuum tube, a common load impedance having a first terminal coupled to said cathode electrodes of said first and second vacuum tubes and a second terminal maintained at a common reference potential, said anode of said first vacuum tube being coupled to a voltage source which is positive with respect to said common reference potential, an output circuit having a first terminal coupled to said anode electrode of said second vacuum tube and a second terminal coupled to said positive voltage source, an impedance having a first terminal coupled to said control electrode of said second vacuum tube and a second terminal maintained at said common reference potential, and a crystal coupled between said control electrodes of said first and second vacuum tubes.

2. Apparatus according to claim 1 in which said common load impedance includes a resistor.

3. Apparatus according to claim 1 in which said common load impedance includes an inductor.

4. A carrier frequency rejection amplifier including, in combination, first and second vacuum tubes each having anode, cathode, and control electrodes, an input circuit coupled between said cathode and control electrodes of said first vacuum tube, a common load impedance having a first terminal coupled to said cathode electrodes of said first and second vacuum tubes and a second terminal maintained at a common reference potential, said anode of said first vacuum tube being coupled to a voltage source which is positive with respect to said common reference potential, an output circuit having a first terminal coupled to said anode electrode of said second vacuum tube and a second terminal coupled to said positive voltage source, an impedance having a first terminal coupled to said control electrode of said second vacuum tube and a second terminal maintained at said common reference potential, and a series-resonant circuit coupled between said control electrodes of said first and second vacuum tubes.

5. A carrier frequency rejection amplifier including, in combination, first and second vacuum tubes each having anode, cathode, and control electrodes, an input circuit coupled between said cathode and control electrodes of said first vacuum tube, a common load impedance having a first terminal coupled to said cathode electrodes of said first and second vacuum tubes and a second terminal maintained at a common reference potential, said anode of said first vacuum tube being directly connected to a voltage source which is positive with respect to said common reference potential, an output circuit having a first terminal coupled to said anode electrode of said second vacuum tube and a second terminal coupled to said positive voltage source, a variable resistor having a first terminal coupled to said control electrode of said second vacuum tube and a second terminal maintained at said common reference potential, and a crystal coupled between said control electrodes of said first and second vacuum tubes.

References Cited in the file of this patent

UNITED STATES PATENTS

| | | |
|---|---|---|
| 1,794,847 | Green | Mar. 3, 1931 |
| 2,276,565 | Crosby | Mar. 17, 1942 |
| 2,460,907 | Schroeder | Feb. 8, 1949 |
| 2,490,448 | Lott | Dec. 6, 1949 |